(12) United States Patent
Wang et al.

(10) Patent No.: US 11,697,962 B2
(45) Date of Patent: *Jul. 11, 2023

(54) OPENING AND CLOSING MECHANISM AND TRAIN HAVING THE SAME

(71) Applicant: CRRC QINGDAO SIFANG ROLLING STOCK RESEARCH INSTITUTE CO., LTD., Qingdao (CN)

(72) Inventors: Kun Wang, Qingdao (CN); Yangxuan Su, Qingdao (CN); Hui Liu, Qingdao (CN); Guangming Zhang, Qingdao (CN); Xiaobo Liu, Qingdao (CN); Chunwei Zhang, Qingdao (CN); Anshen Zhang, Qingdao (CN)

(73) Assignee: CRRC QINGDAO SIFANG ROLLING STOCK RESEARCH INSTITUTE CO., LTD., Qingdao (CN)

( * ) Notice: Subject to any disclaimer, the term of this patent is extended or adjusted under 35 U.S.C. 154(b) by 531 days.

This patent is subject to a terminal disclaimer.

(21) Appl. No.: 16/846,342

(22) Filed: Apr. 12, 2020

(65) Prior Publication Data

US 2020/0240201 A1 Jul. 30, 2020

Related U.S. Application Data

(63) Continuation-in-part of application No. 15/832,655, filed on Dec. 5, 2017, now Pat. No. 10,655,381, (Continued)

(30) Foreign Application Priority Data

Oct. 18, 2013 (CN) .......................... 201310493600.1

(51) Int. Cl.
*E06B 3/32* (2006.01)
*B61D 17/06* (2006.01)

(52) U.S. Cl.
CPC .............. *E06B 3/325* (2013.01); *B61D 17/06* (2013.01); *E05Y 2900/51* (2013.01)

(58) Field of Classification Search
CPC ..... E06B 3/325; E05Y 2900/51; Y02T 30/00; B61D 17/02; B61D 17/06
See application file for complete search history.

(56) References Cited

U.S. PATENT DOCUMENTS 965,770 A * 7/1910 Voigt .................... E05F 15/649
49/363
1,821,121 A 4/1928 Stedefeld
(Continued)

FOREIGN PATENT DOCUMENTS

CN 201206386 Y 3/2009
CN 201530582 U 7/2010
(Continued)

OTHER PUBLICATIONS

International Search Report of corresponding International application No. PCT/CN2013/087112, dated Jul. 14, 2014.
(Continued)

*Primary Examiner* — Abe Massad
(74) *Attorney, Agent, or Firm* — J.C. Patents

(57) ABSTRACT

The present application relates to an opening and closing mechanism and a train having the same. The opening and closing mechanism comprise a driving device, a locking device and a support arm; the driving device is connected to the locking device to drive the locking device to rotate; a first end of the locking device is rotatably mounted on a baseplate; a sliding groove in which a second end of the locking device is slidably located is formed on the support (Continued)

arm; a first end of the support arm is rotatably mounted on the baseplate; a second end of the support arm is connected to a fairing; the driving device drives the locking device to rotate, the locking device drives the support arm to rotate by the sliding groove, so that the support arm opens or closes the fairing.

15 Claims, 23 Drawing Sheets

Related U.S. Application Data which is a continuation-in-part of application No. 14/991,907, filed on Jan. 8, 2016, now abandoned, which is a continuation-in-part of application No. PCT/CN2013/087112, filed on Nov. 14, 2013.

(56) References Cited

U.S. PATENT DOCUMENTS

| | | | | |
|---|---|---|---|---|
| 3,438,148 | A * | 4/1969 | Daugirdas | E05F 15/40 49/363 |
| 3,782,034 | A * | 1/1974 | Lynn | E05F 15/40 49/140 |
| 4,087,939 | A * | 5/1978 | Elguindy | E05F 17/004 49/118 |
| 4,655,144 | A | 4/1987 | Freeh et al. | |
| 4,882,876 | A * | 11/1989 | Daugirdas | E05F 15/565 49/141 |
| 5,010,622 | A * | 4/1991 | Morita | E05C 17/56 292/DIG. 19 |
| 5,104,269 | A | 4/1992 | Hardison | |
| RE36,267 | E * | 8/1999 | Moore | E05F 15/611 49/340 |
| 6,385,910 | B1 | 5/2002 | Smink et al. | |
| 6,640,387 | B2 * | 11/2003 | Alonso | E05F 3/221 16/72 |
| 8,468,953 | B2 * | 6/2013 | Ahrens | B61D 17/06 105/1.1 |
| 9,022,238 | B2 | 5/2015 | Bremekamp et al. | |
| 2003/0217513 | A1 * | 11/2003 | Fink | B60J 5/062 49/360 |
| 2011/0296762 | A1 | 12/2011 | Ahrens | |
| 2012/0006386 | A1 | 1/2012 | Klinga et al. | |
| 2013/0042788 | A1 | 2/2013 | Scholz | |
| 2013/0133547 | A1 | 5/2013 | Heinishch et al. | |

FOREIGN PATENT DOCUMENTS

| | | |
|---|---|---|
| CN | 102933445 A | 2/2013 |
| CN | 103015828 A | 4/2013 |
| CN | 203097558 U | 7/2013 |
| CN | 203515122 U | 4/2014 |
| DE | 297 06 073 U1 | 7/1997 |
| JP | S60-84359 U | 6/1985 |
| JP | H04-83972 U | 7/1992 |
| JP | H04-99171 U | 8/1992 |
| JP | 2000-344101 A | 12/2000 |
| JP | 2006-214190 A | 8/2006 |
| JP | 2008-037386 A | 2/2008 |
| WO | 2007-073273 A1 | 6/2007 |
| WO | 2011-154527 A1 | 12/2011 |

OTHER PUBLICATIONS

The Chinese First Examination Report of corresponding Chinese application No. 201310493600.1, dated May 5, 2015.

* cited by examiner

OPENING AND CLOSING MECHANISM AND TRAIN HAVING THE SAME

CROSS-REFERENCE TO RELATED APPLICATION

This application is a continuation-in-part application of, and claims the priority benefit of, U.S. application Ser. No. 15/832,655, filed on Dec. 5, 2017, now allowed, which is a continuation-in-part application of, and claims the priority benefit of, U.S. application Ser. No. 14/991,907, filed on Jan. 8, 2016, now abandoned, which is a continuation-in-part of international Application No. PCT/CN2013/087112, filed on Nov. 14, 2013, which in turn claims the priority benefits of Chinese Patent Application No. 201310493600.1, filed on Oct. 18, 2013. The contents of the above identified applications are incorporated herein by reference in their entirety.

TECHNICAL FIELD

The present application relates to the field of mechanical manufacturing technology, in particular to an opening and closing mechanism and a train having the same.

BACKGROUND OF THE PRESENT INVENTION

In order to realize reconnection or return rescue, usually a front-end opening and closing mechanism is installed in a railway high-speed train. As an important part of a railway high-speed train, the front-end opening and closing mechanism is at a closed state during normal running (i.e. at a non-reconnection state) of the railway high-speed train, during this time, a front-end fairing cabin door is closed so as to prevent vanes, dust, ice and snow from entering and to protect the coupler and other facilities in the front-end fairing, ensuring a good aerodynamic profile of the railway high-speed train. In case of return or rescue, the opening and closing mechanism can be either automatically opened or manually opened, thus opening the front-end fairing cabin door, the full-automatic coupler is stretched out for normal coupling.

At present, a familiar front-end opening and closing mechanism usually consists of a pushing device and a locking device. In order to achieve opening and closing the opening and closing mechanism and realize a reliable locking, the conventional opening and closing mechanism usually is provided with several independent locking devices. Consequently, the opening-closing process and the locking process of the opening and closing mechanism usually are achieved by different operations, which require two or more different air cylinders, resulting in comparatively complex mechanical structure and automatic control theory of the opening and closing mechanism, as well as correspondingly higher cost and lower reliability.

Chinese Patent Application CN201206386Y disclosed a front-cover opening and closing mechanism which provides a four-link device to implement a return mechanism which drives left and right portions of the front cover to automatically open/close along a set track. Essentially, the mounting wing rotates around the rotating shaft to realize the function of opening or closing. In an implementation, the connecting base is pulled to do anterior-posterior translation by the effect of the opening and closing cylinder, and the translation is applied to the mounting wing by the links so that the mounting wing is opened/closed.

SUMMARY OF THE PRESENT INVENTION

The present application provides an opening and closing mechanism which is simple and reliable in structure and convenient in maintenance, and a train having the opening and closing mechanism.

A first implementation of the present application provides an opening and closing mechanism, comprising a driving device, a locking device and a support arm;

the driving device is connected to the locking device to drive the locking device to rotate;

a first end of the locking device is rotatably mounted on a baseplate;

a sliding groove in which a second end of the locking device is slidably located is formed on the support arm;

a first end of the support arm is rotatably mounted on the baseplate; a second end of the support arm is connected to a fairing;

the driving device drives the locking device to rotate, the locking device drives the support arm to rotate by the sliding groove, so that the support arm opens or closes the fairing.

Optionally, the opening and closing mechanism has a limit stop including a closed-state limit stop and an open-state limit stop, used to limit the closing and opening of the fairing respectively.

Optionally, each limit stop has a projection and a receive part, which restrain against each other to limit the closing or opening of the fairing.

Optionally, the sliding groove is arranged so that when the locking device is perpendicular to the sliding groove, the locking device is able to continuously move in the sliding groove to realize self-locking. Optionally, the sliding groove is arranged so that when the locking device is perpendicular to the sliding groove, there is an allowance L between a side of the sliding groove close to the second end of the support arm and the second end of the locking device and thus the locking device is able to continuously move in the sliding groove to realize self-locking.

Optionally, the opening and closing mechanism further has an elastic member, working together with the locking device, the support arm and the limit stop to realize the self-locking of the opening and closing mechanism.

1. Optionally, the elastic member is arranged in the locking device, the elastic member comprises a rod on which a spring is pre-compressed; a first end of the rod is a free end, a second end of the rod is provided with a raised member which serves as the second end of the locking device and is slidably located in the sliding groove.

2. Optionally, the elastic member is arranged on the limit stop so that the limit stop is able to have elastic deformation. Optionally, the elastic member is a contact part with elasticity, is arranged on the projection, and is compressed when coming into contact with the receive part. Optionally, the contact part is made according to the principle of springs or made from elastic material.

3. Optionally, the elastic member is arranged between the second end of the locking device and the sliding groove. The elastic member is arranged at least at a contact position where the second end of the locking device comes into contact with the sliding groove. The contact position is a position where the second end of the locking device comes into contact with the sliding groove when the locking device is substantially perpendicular to the sliding groove during the opening or closing of the fairing.

3.1 Optionally, the elastic member is arranged in the sliding groove. The elastic member is compressed, when the locking device is substantially perpendicular to the sliding groove, during the opening or closing of the fairing.

Optionally, the elastic member is made from deformable material and mounted in the sliding groove.

Optionally, a first gap is formed by the elastic member in the sliding groove. The first gap has a width less than a diameter of the second end of the locking device. The elastic member can be a third projection with elasticity and the first gap is formed between the third projection and the sliding groove; or, the elastic member can be a third projection and a fourth projection, which are elastic and which are arranged opposite to each other, and the first gap is formed between the third projection and the fourth projection.

3.2 Optionally, the elastic member is arranged at the second end of the locking device. The elastic member is compressed, when the locking device is substantially perpendicular to the sliding groove, during the opening or closing of the fairing.

Optionally, the elastic member is an elastic rolling wheel sleeved on the second end of the locking device.

Optionally, a second gap is formed in the sliding groove. The second gap has a width less than a diameter of the second end of the locking device.

Optionally, the driving device is a powered push cylinder having a piston rod connected to the locking device to drive the locking device to rotate.

A second implementation of the present application provides a train having the opening and closing mechanism. The opening and closing mechanism is the opening and closing mechanism described in any of the above technical solutions. Optionally, the train has two opening and closing mechanisms which are arranged symmetrically.

DETAILED DESCRIPTION OF THE PRESENT INVENTION

Figure 1:
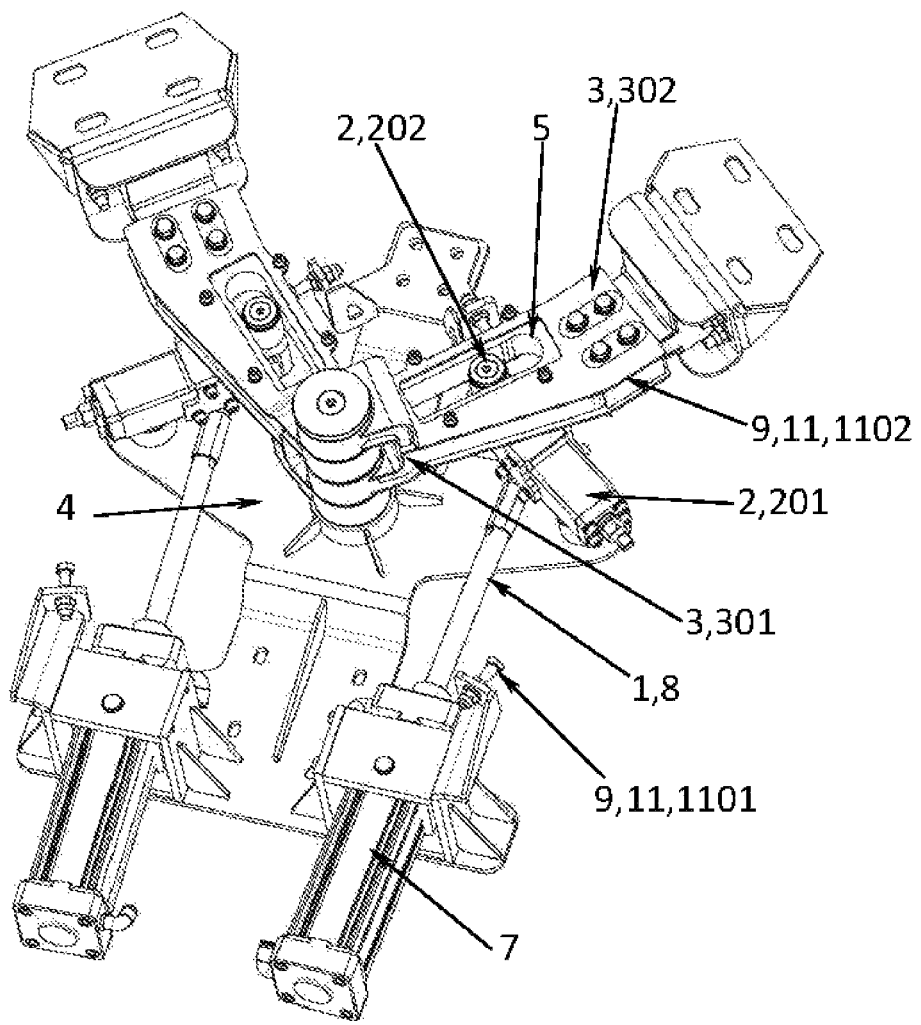
FIG. 1 is a top perspective view of the opening and closing mechanism according to an implementation.

The technical solutions of the present application will be described below in detail by specific implementations. However, it should be understood that, unless otherwise stated, elements, structures and features in one implementation may be beneficially combined in other implementations.

In the description of the present application, it is to be noted that terms "first", "second" and the like are merely descriptive and should not be interpreted to indicate or imply the relative importance; and terms "front", "rear", "left", "right" and the like are used with respect to the directions in the drawings and form no absolute limitation to the position. The implementations are merely descriptions of the preferred implementation of the present application and form no limitation to the scope of the present application. Any modifications and improvements made to the technical solutions of the present application by a person of ordinary skill in the art shall fall into the protection scope defined by the appended claims, without departing from the design spirit of the present application.

As shown in FIGS. 1-4 (the fairings are omitted in FIG. 1), a first implementation of the present application provides an opening and closing mechanism, comprising a driving device 1, a locking device 2 and a support arm 3.

The driving device 1 is connected to the locking device 2 to drive the locking device 2 to rotate;

a first end 201 of the locking device 2 is rotatably mounted on a baseplate 4 so that the locking device 2 can be pushed to rotate by the driving device 1;

a sliding groove 5 in which a second end 202 of the locking device 2 is slidably located is formed on the support arm 3;

the first end 301 of the support arm 3 is rotatably mounted on the baseplate 4; a second end 302 of the support arm 3 is connected to a fairing 6;

the driving device 1 drives the locking device 2 to rotate, the locking device 2 drives the support arm 3 to rotate by the sliding groove 5 so that the support arm 3 opens or closes the fairing 6.

Figure 3A:
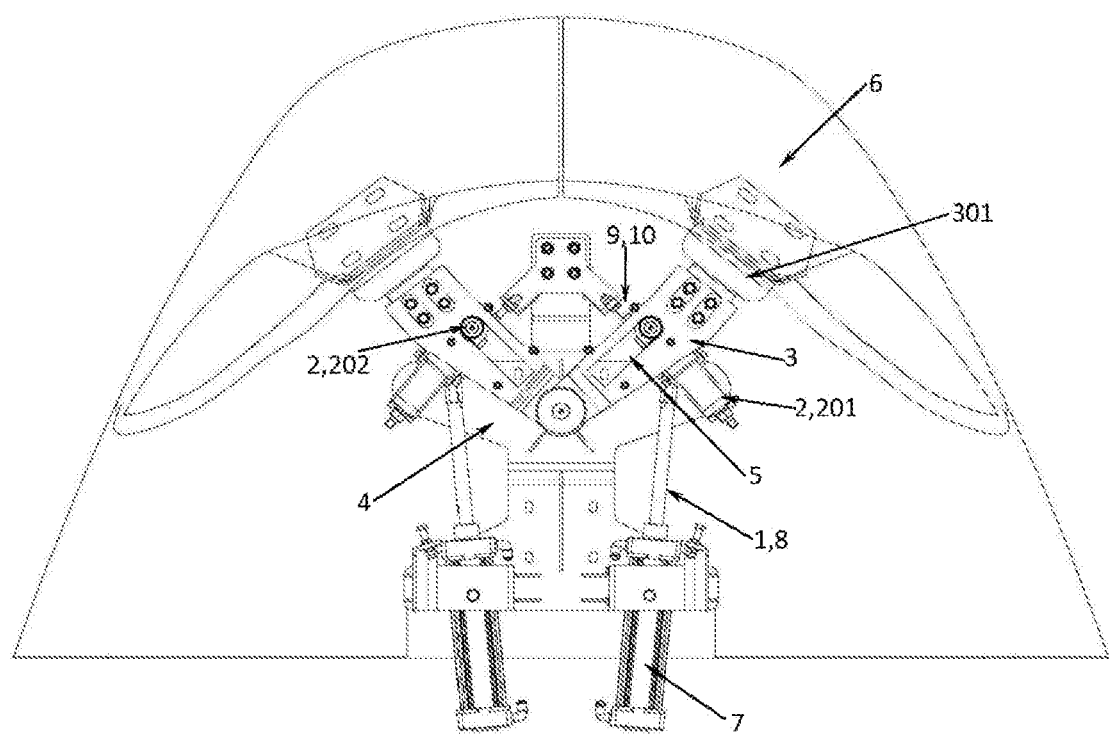
FIGS. 3A-3I show the opening flow of the opening and closing mechanism.

Optionally, the driving device 1 can be a powered push cylinder as shown in FIG. 1 and FIG. 3A. The powered push cylinder has a fixation portion 7 mounted on the baseplate 4 and a piston rod 8 hinged to the locking device 2 to push the locking device 2 to rotate on the baseplate 4. It is to be noted that the driving device 1 is not limited to the powered push cylinder. Other devices are also possible as long as they can drive the locking device 2 to rotate.

Figure 2:
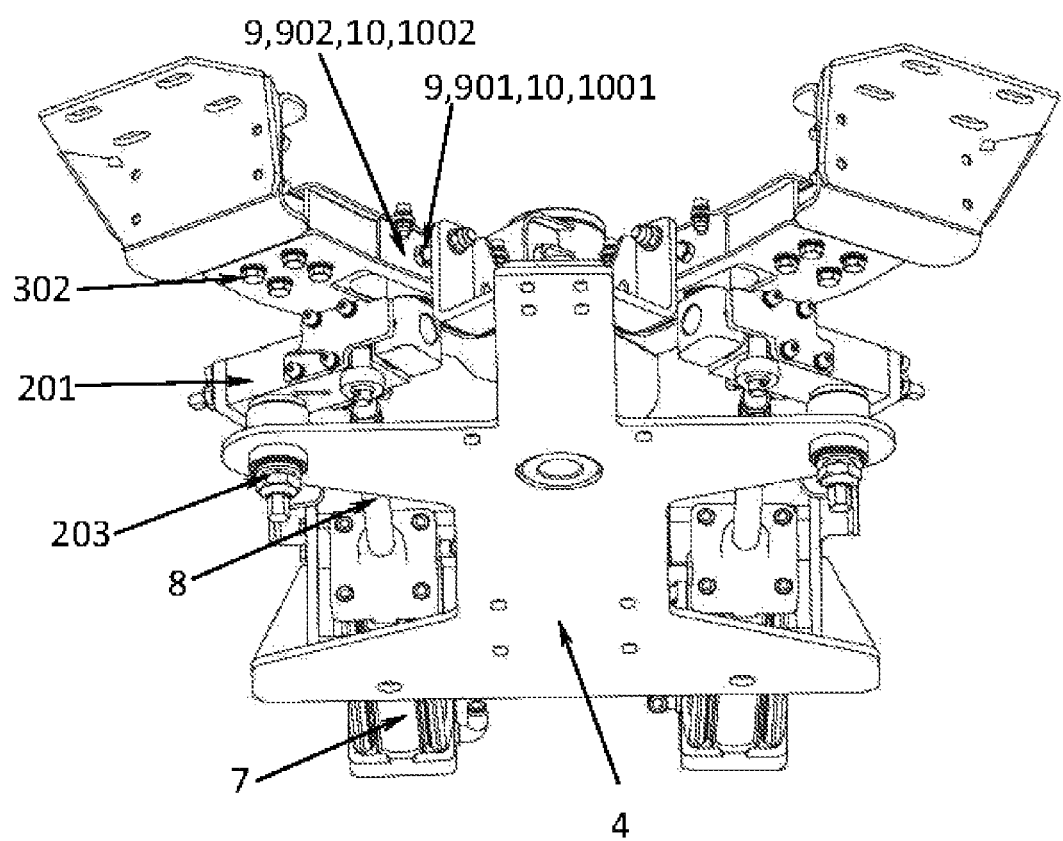
FIG. 2 is a bottom perspective view of FIG. 1.
Figure 3B:
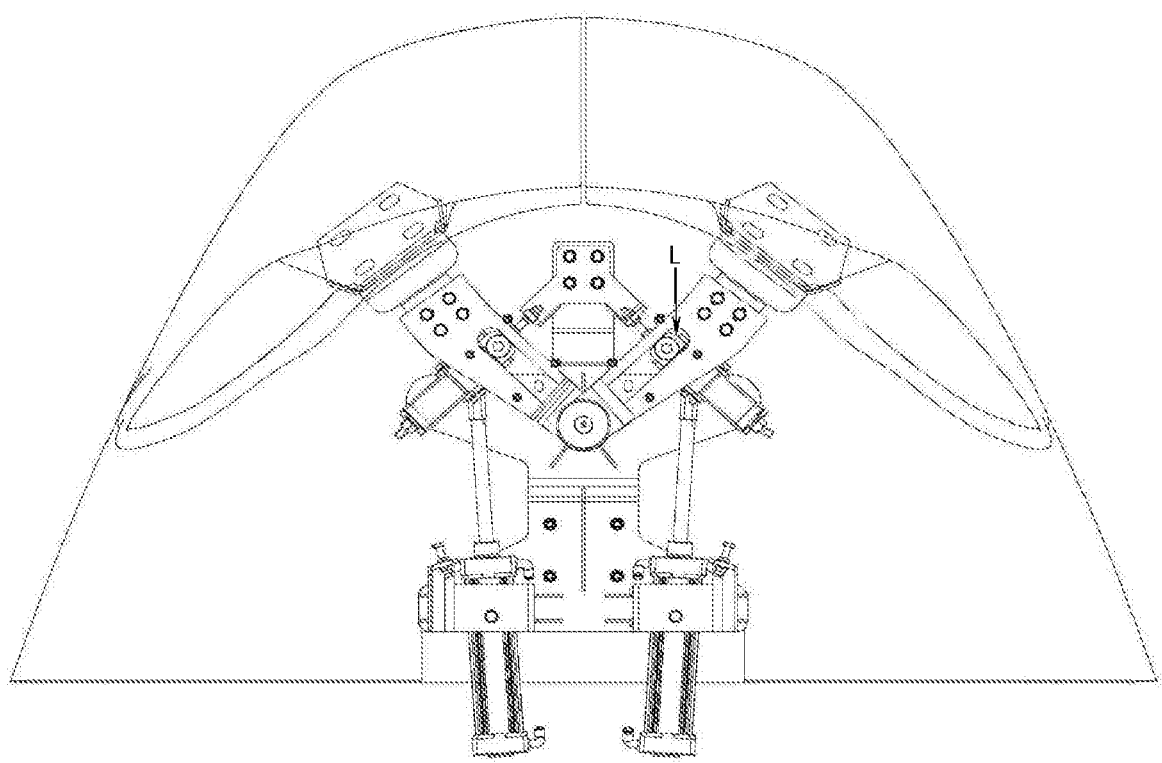
Figure 3C:
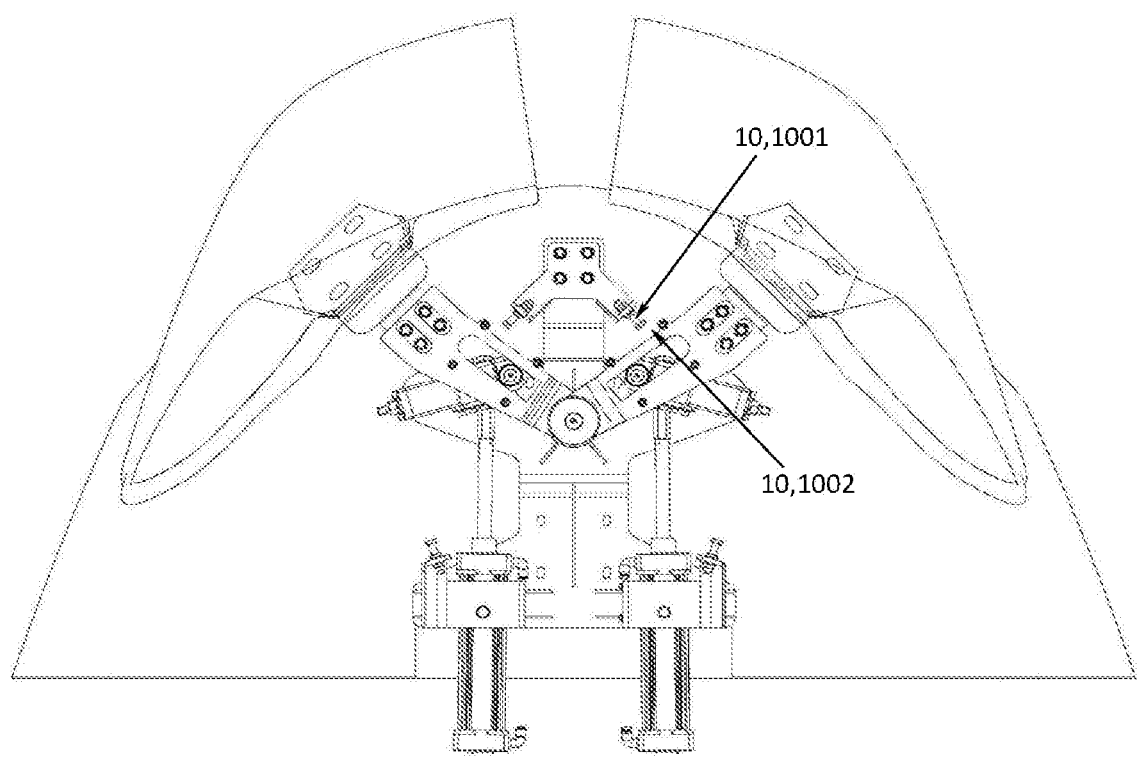
Figure 3D:
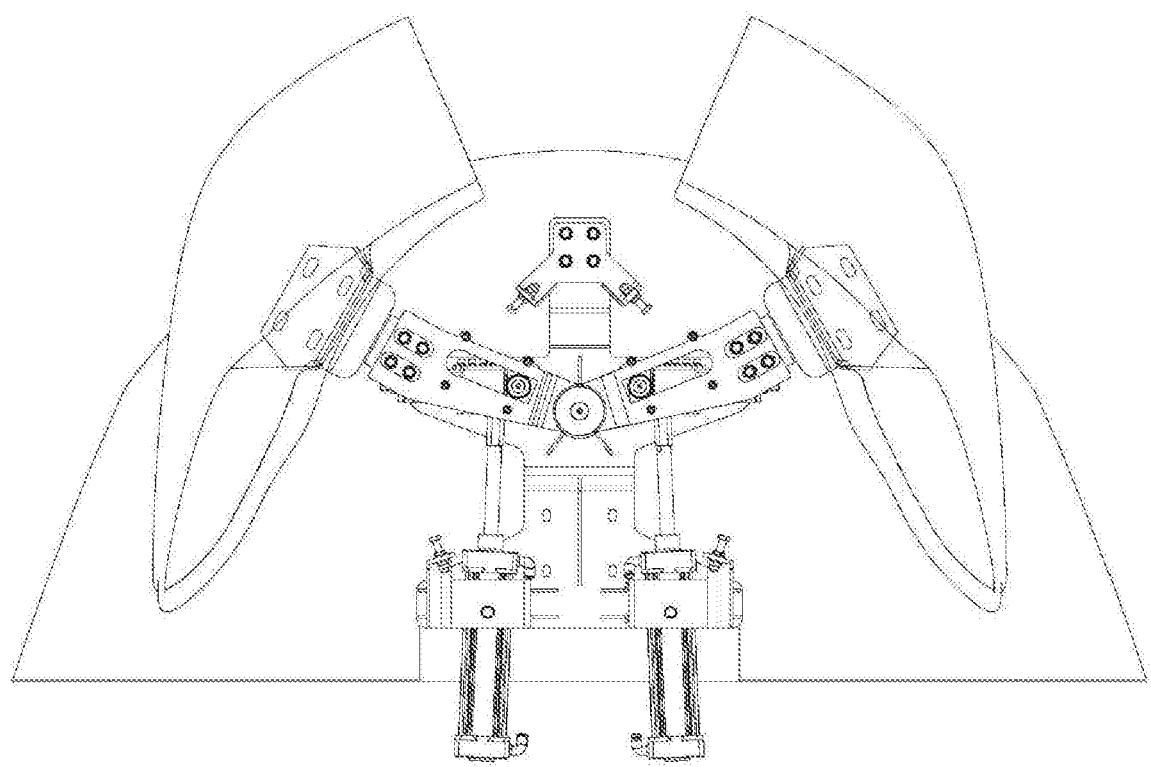
Figure 3E:
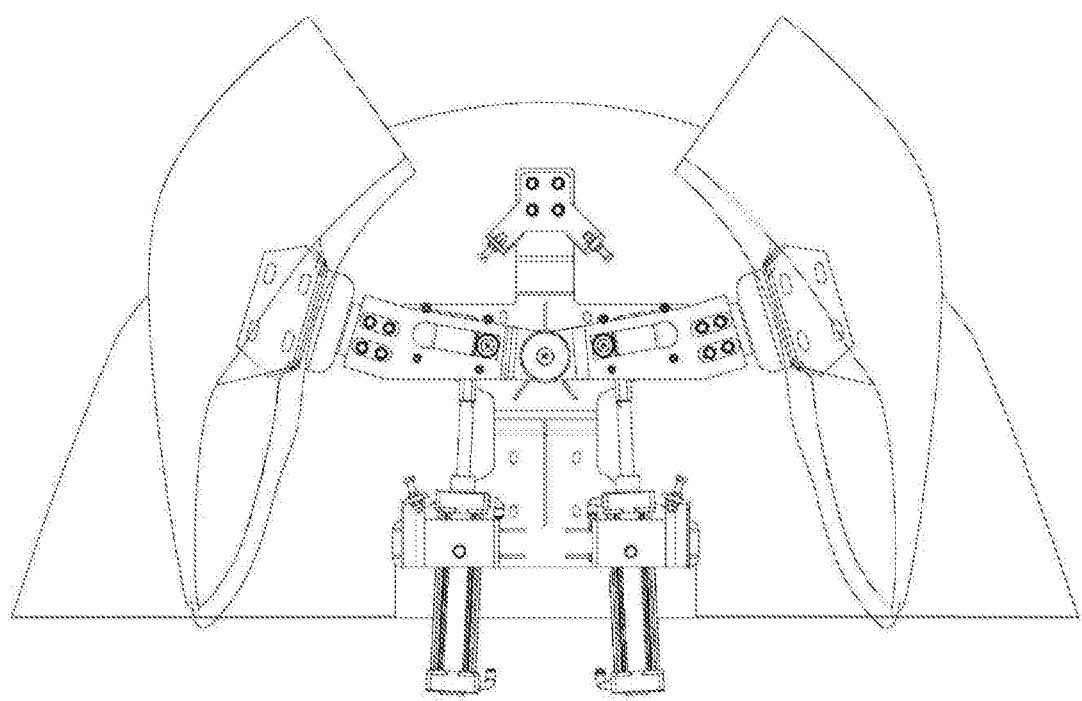
Figure 3F:
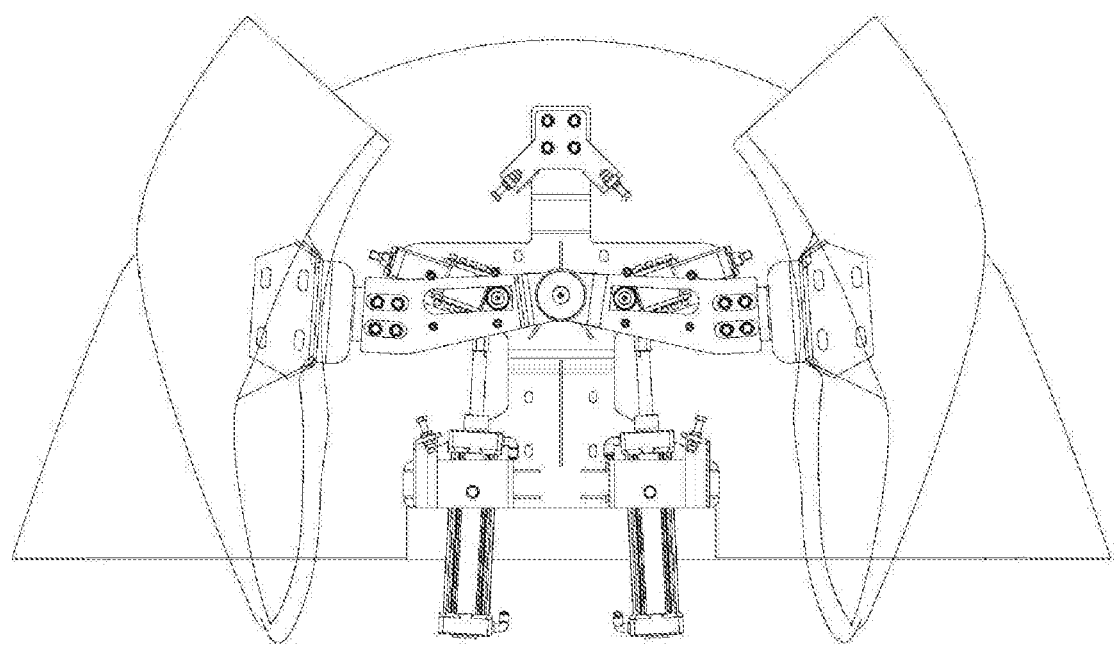
Figure 3G:
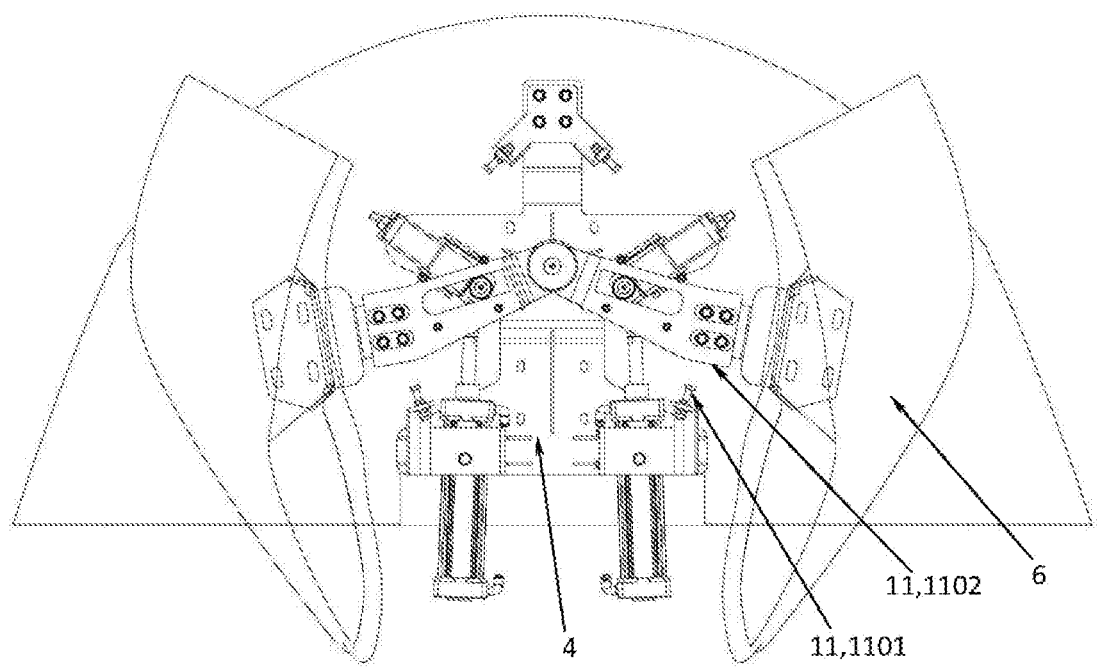
Figure 3H:
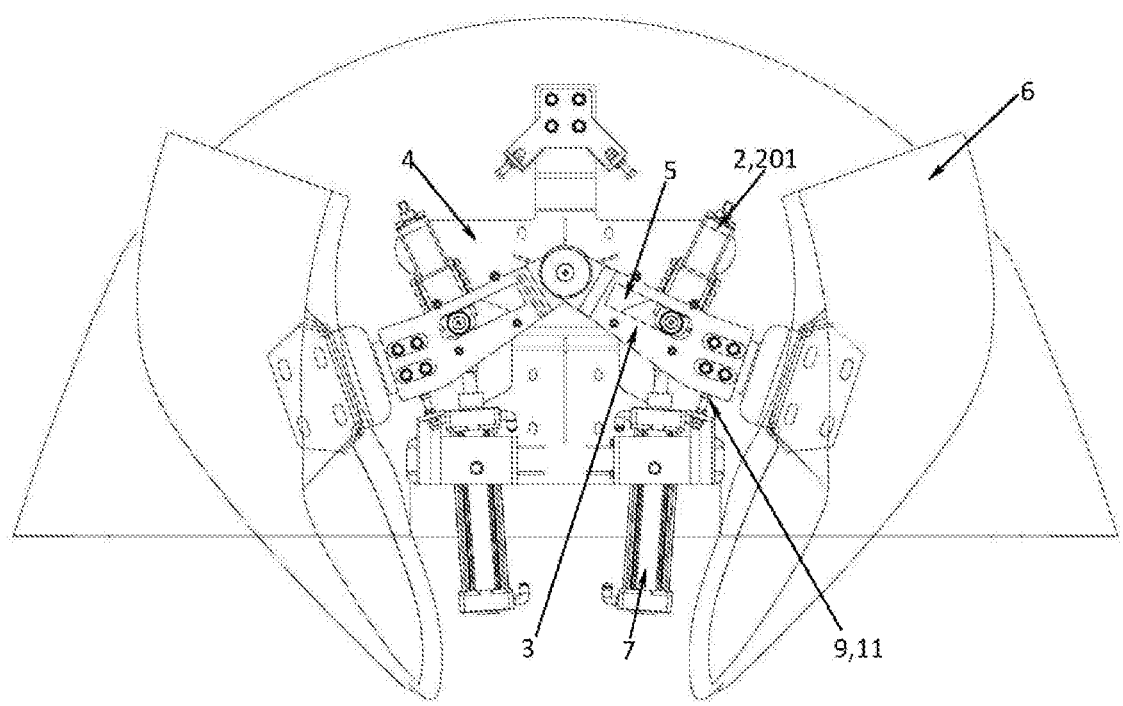
Figure 3I:
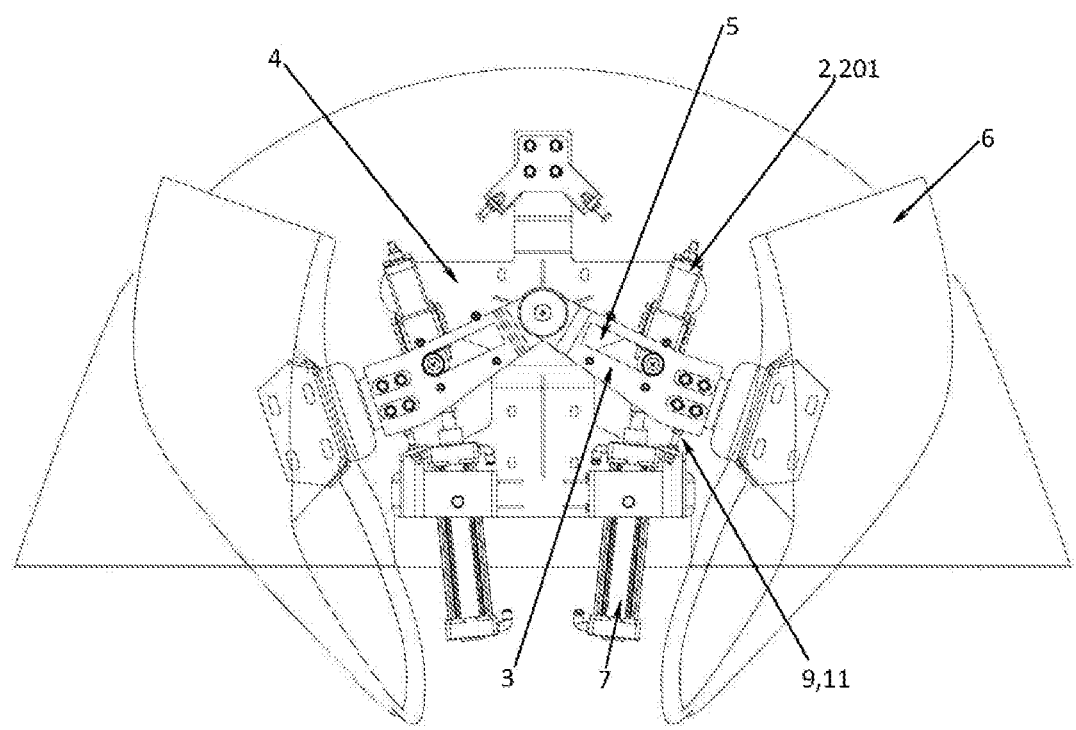

Optionally, as shown in FIG. 3A and FIG. 3I, the opening and closing mechanism further comprises a limit stop 9 including a closed-state limit stop 10 and an open-state limit stop 11. Each limit stop 9 may comprise a projection 901 and a receive part 902. Specifically:

As shown in FIG. 2 and FIG. 3C, the closed-state limit stop 10 is arranged at a position close to the closing position of the fairing 6 and comprises a first projection 1001 and a first receive part 1002, wherein one can restrict the continuous motion of the other. They work together to prevent the continuous closing of the fairing 6 after reaching a set degree of closing, thus to avoid any damage to the fairing 6. As shown in FIG. 3G and FIG. 3H, the open-state limit stop 11 is arranged at a position close to the opening position of the fairing and comprises a second projection 1101 and a second receive part 1102, wherein one can restrict the continuous motion of the other. They work together to prevent the continuous opening of the fairing 6 after reaching a set degree of opening.

Optionally, as shown in FIG. 3C, the first projection 1001 is arranged on the baseplate 4 close to the closing position of the fairing 6, and the first receive part 1002 is arranged on the support arm 3 close to the closing position of the fairing 6. Or, the positions of the first projection 1001 and the first receive part 1002 can be changed. That is, the first projection 1001 is arranged on the support arm 3 close to the closing position of the fairing 6, and the first receive part 1002 is arranged on the baseplate 4 close to the closing position of the fairing 6.

Optionally, as shown in FIG. 3G, the second projection 1101 is arranged on the baseplate 4 close to the opening position of the fairing 6, and the second receive part 1102 is arranged on the support arm 3 close to the opening position of the fairing 6. Or, the positions of the second projection 1101 and the second receive part 1102 can be changed.

Figure 4A:
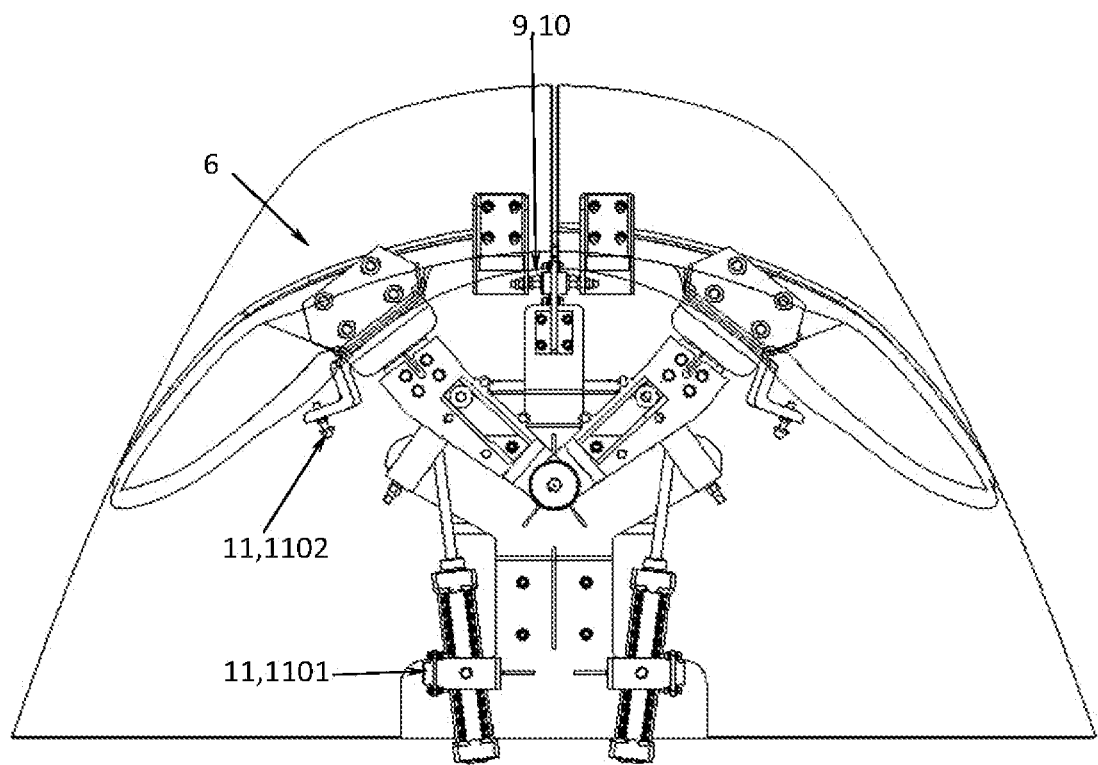
FIG. 4A shows the closed-state of the opening and closing mechanism according to another implementation.
Figure 4B:
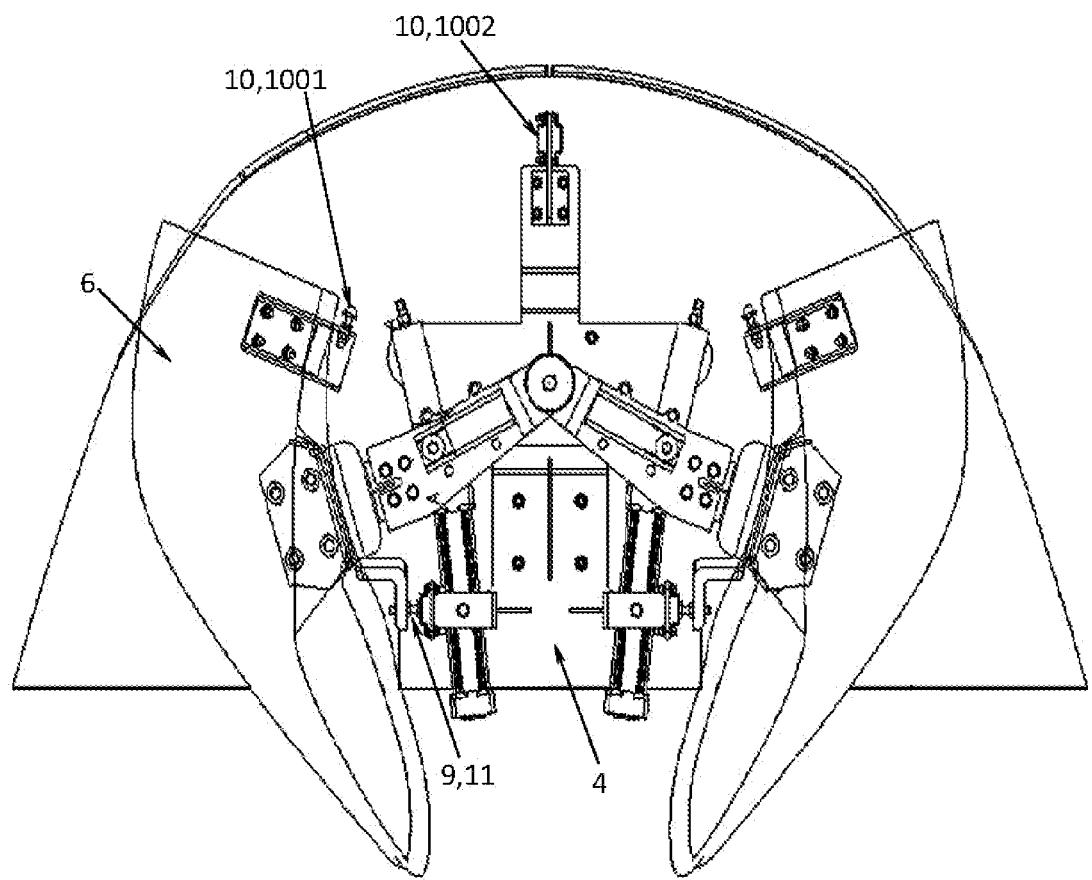
FIG. 4B shows the open-state of the opening and closing mechanism of FIG. 4A.

As an alternative implementation, as shown in FIG. 4A and FIG. 4B, the first projection 1001 is arranged on the fairing 6 close to the closing position of the fairing 6, and the first receive part 1002 is arranged on the baseplate 4 close to the closing position of the fairing 6. Or, the positions of the first projection 1001 and the first receive part 1002 can be changed.

As an alternative implementation, as shown in FIG. 4A and FIG. 4B, the second projection 1101 is arranged on the fairing 6 close to the opening position of the fairing 6, and the second receive part 1102 is arranged on the baseplate 4 close to the opening position of the fairing 6. Or, the positions of the second projection 1101 and the second receive part 1102 can be changed.

The position of the limit stop 9 is not limited to the above implementations. The purpose is to prevent the continuous closing or opening of the fairing 6 after reaching a certain closed or open degree by the mutual limit of the projection and the receive part, thus to avoid any damage to the fairing 6.

Optionally, the sliding groove 5 is arranged so that the locking device 2 is able to continuously move in the sliding groove 5 to realize self-locking when the locking device 2 is substantially perpendicular to the sliding groove 5.

Figure 7A:
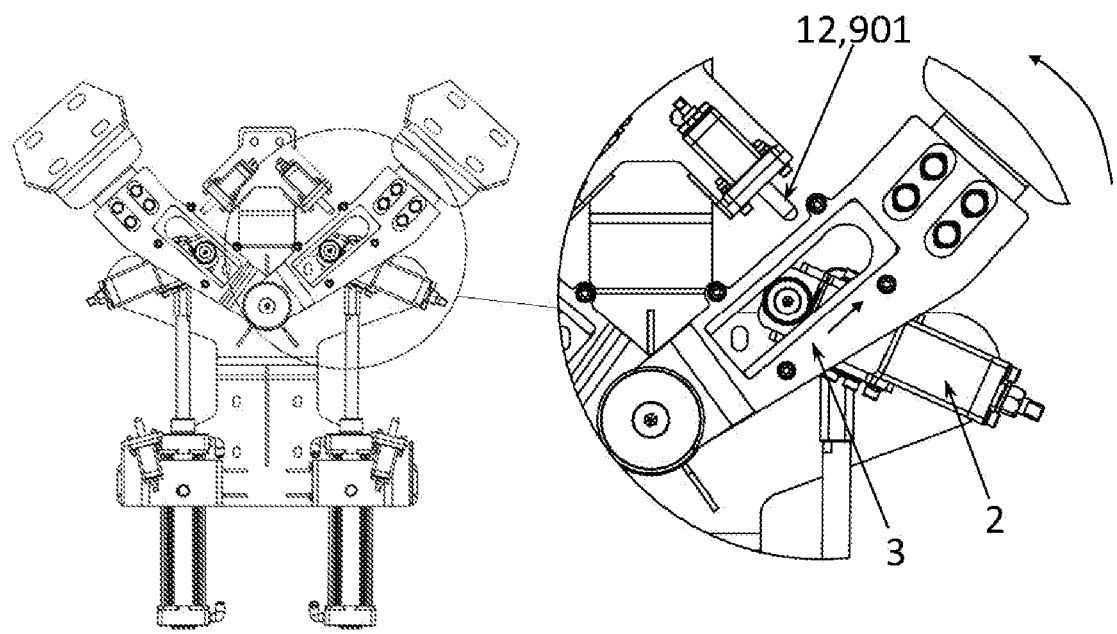
FIGS. 7A-7D show the closing flow of the opening and closing mechanism having the second elastic member.
Figure 7B:
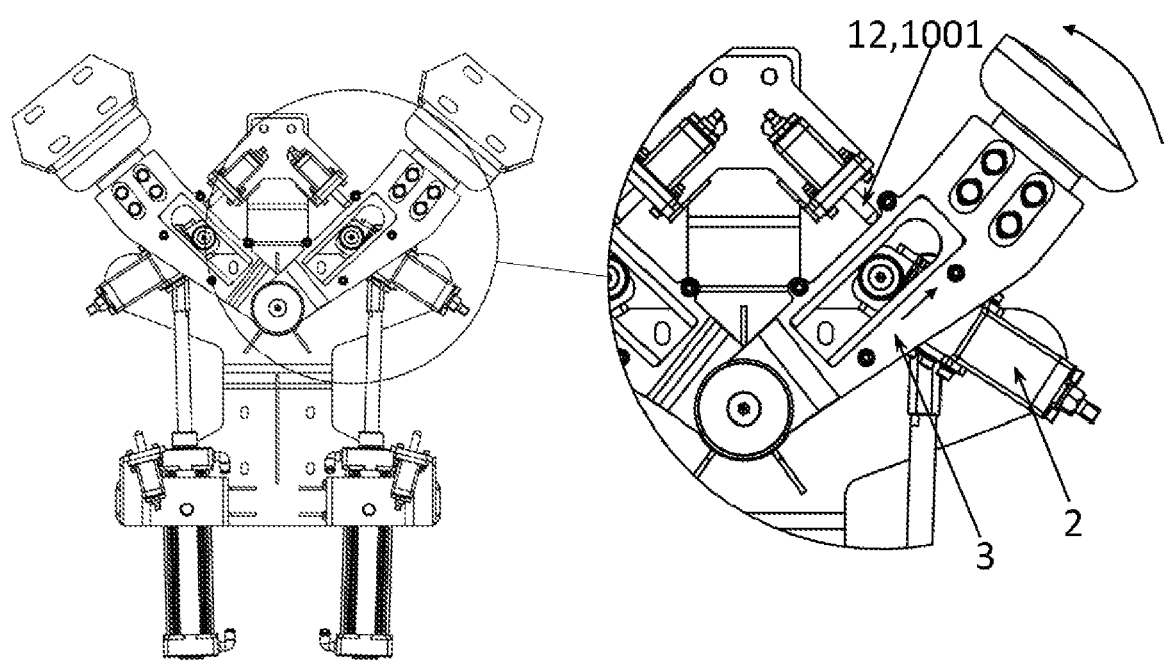
Figure 7C:
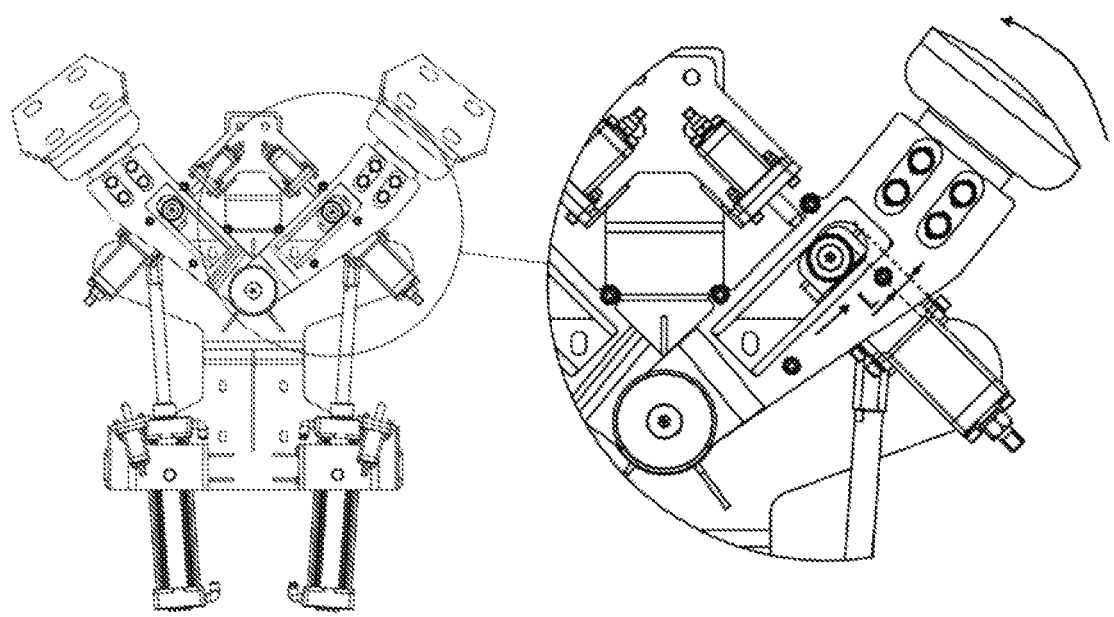

Specifically, the sliding groove 5 may be arranged so that there is an allowance L between a side of the sliding groove close to the second end 302 of the support arm and the second end 202 of the locking device when the locking device 2 is perpendicular to the sliding groove, as shown in FIG. 3B and FIG. 7C, so that the locking device can continuously move in the sliding groove to realize self-locking.

Optionally, the opening and closing mechanism further has an elastic member 12 which works together with the locking device 2, the support arm 3 and the limit stop 9 to realize the self-locking of the opening and closing mechanism in the closed state or open state. The stability of the opening and closing mechanism is improved. Specifically, the elastic member 12 may be implemented at least by the following embodiments.

Embodiment 1

Figure 5A:
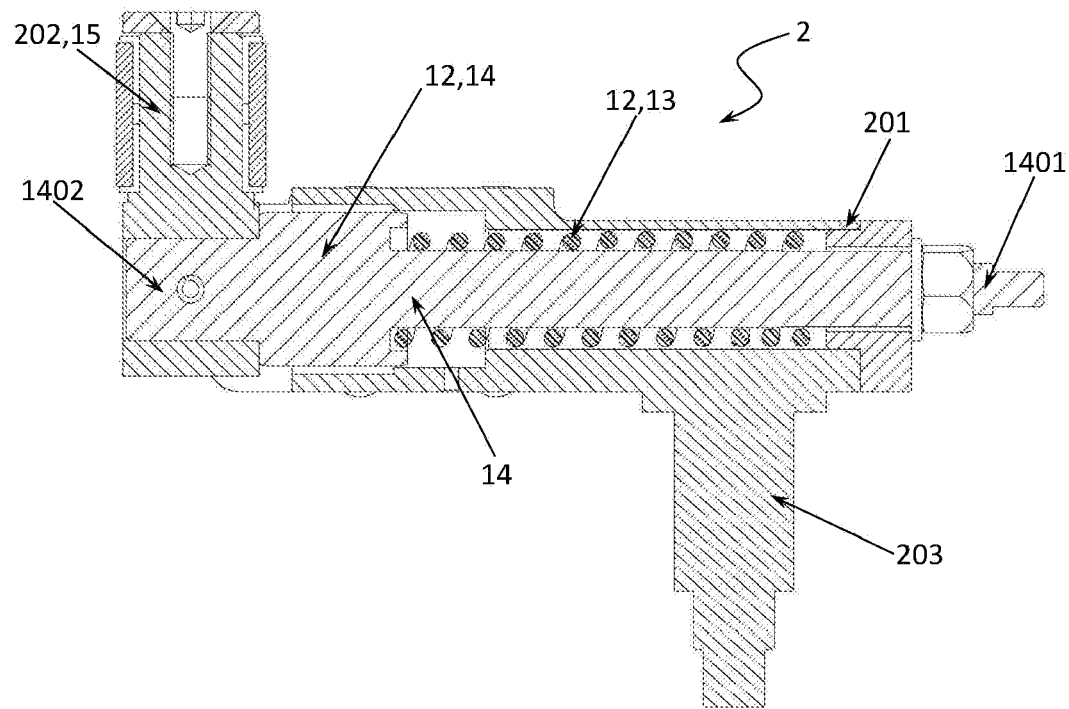
FIGS. 5A-5B are schematic views of a first elastic member.
Figure 5B:
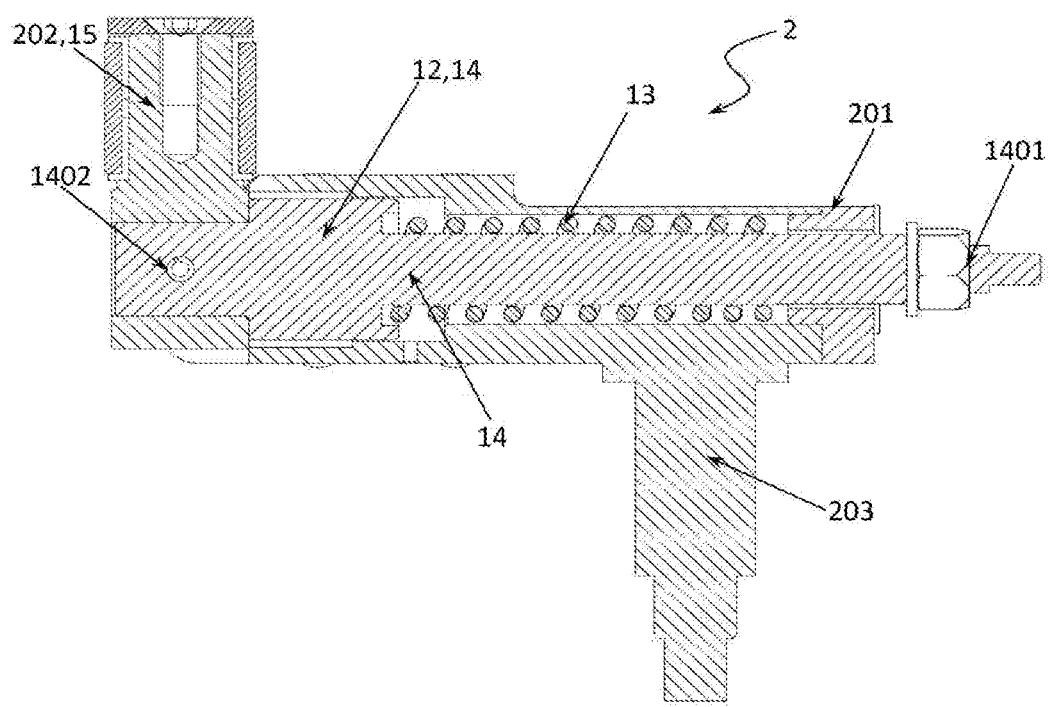

As shown in FIG. 5A and FIG. 5B, the locking device 2 has an elastic member 12. The elastic member 12 comprises a rod 14 on which a spring 13 is pre-compressed, a first end 1401 of the rod is a free end, a second end 1402 of the rod is provided with a raised member 15 which serves as the second end 202 of the locking device and can be slidably located in the sliding groove 5. When the second end 202 of the locking device is squeezed, the rod 14 can move towards the first end 1401 (as shown in FIG. 5B); and when the second end 202 of the locking device is less squeezed or not squeezed, the rod 14 returns to the its original position (as shown in FIG. 5A).

Taking Embodiment 1 as an example, the working process and principle of the opening and closing mechanism will be described below. FIG. 3A to FIG. 3I successively show steps of operating the opening and closing mechanism from the closed state to the open state. Inversely, FIG. 3I to FIG. 3A show the steps of operating the opening and closing mechanism from the open state to the closed state. In the drawings, left and right opening and closing mechanisms are shown. Here, the description is given by taking the opening and closing mechanism on the right side as an example.

(1) Opening Process:

As shown in FIG. 3A to FIG. 3H, the locking device 2 is rotated counterclockwise above the baseplate 4 due to the cylinder (retraction). The second end 202 of the locking device moves in the sliding groove 5 and also drives the support arm 3 to rotate clockwise. The fairing 6 is driven by the support arm 3 to rotate clockwise to an open state. During the opening process, the second projection 1101 and the second receive part 1102 of the open-state limit stop 11 contact with each other and start to limit each other, and the support arm 3 cannot be continuously rotated due to the open-state limit stop 11. In this case, if the second end 202 of the locking device 2 is continuously rotated, it is needed to overcome the elasticity of the elastic member. Thus, the spring 13 is gradually compressed.

In FIG. 3H, when the locking device 2 is rotated until its central axis is substantially perpendicular to the central axis of the support arm (that is, the rod 14 is substantially perpendicular to the support arm 3), a critical point of open mechanical "dead point" is reached; at this moment, a rotating shaft 203 of the locking device is closest to the support arm 3, and the spring 13 is compressed to the shortest state since the second projection 1101 and the second receive part 1102 are limiting against each other. When continuously rotating the locking device 2, due to the second projection 1101 and the second receive part 1102, the second end 202 of the locking device continuously rolls in the sliding groove 5 (in FIG. 3H, continuously moves downward to the right) and thus moves beyond the open mechanical "dead point". In this case, the rotating shaft 203 is not shortest from the support arm 3, thus the spring 13 is partially released. In this case, the open state is limited, as shown in FIG. 3I. In the state shown in FIG. 3I, if the second end 202 of the locking device is to move beyond the mechanical dead point in a reverse direction in the sliding groove (that is, is intended to move upward to the left), it can be realized only by applying an external force to compress the spring 13 from the state shown in FIG. 3I to the state shown in FIG. 3H (i.e., by applying a force that further compresses the spring). Therefore, in case of no external force, the locking device 2 is in a self-locking state in the condition shown in FIG. 3I, which is a very stable state. The disengagement of locking device 2 from the self-locking state will not occur even the whole opening and closing mechanism is subject to vibration. Therefore, the opening and closing mechanism is kept at the opening position.

(2) Closing Process:

As shown in FIG. 3I to FIG. 3A, still taking the opening and closing mechanism on the right side as an example, the cylinder extends out and pushes the locking device 2 to rotate clockwise. Due to the external force from the cylinder, the locking device 2 runs to the "dead point" position (FIG. 3H) from the open-state self-locking state (FIG. 3I), and further disengages from the "dead point" position. In this case, the second end 202 of the locking device moves in the sliding groove 5 and also drives the support arm 3 to rotate counterclockwise. The fairing 6 is driven by the support arm 3 to rotate counterclockwise to the closed state. During the closing process, the first projection 1001 and the first receive part 1002 of the closed-state limit stop 10 contact with each other and start to limit each other, and the support arm 3 cannot be continuously rotated due to the closed-state limit stop 10. In this case, if the second end 202 of the locking device 2 is continuously rotated, it is needed to overcome the elasticity. Thus, the spring 13 is gradually compressed.

In FIG. 3B, when the locking device 2 is rotated until its central axis is substantially perpendicular to the central axis of the support arm, a critical point of close mechanical "dead point" is reached; at this moment, the rotating shaft 203 of the locking device is closest to the support arm 3, and the spring 13 is compressed to the shortest state since the first projection 1001 and the first receive part 1002 are limiting against each other. When continuously rotating the locking device 2, due to the first projection 1001 and the first receive part 1002, the second end 202 of the locking device continuously rolls in the sliding groove 5 (continuously moves upward to the right) and thus moves beyond the close mechanical dead point. In this case, the rotating shaft 203 is not shortest from the support arm 3, thus the spring 13 is partially released. In this case, the closed state is limited, as shown in FIG. 3A. In the state shown in FIG. 3A, if the second end 202 of the locking device is to move beyond the mechanical dead point in the reverse direction in the sliding groove (that is, is intended to move downward to the left), it can be realized only by applying an external force to compress the spring 13 from the state shown in FIG. 3A to the state shown in FIG. 3B. Therefore, in case of no external force, the locking device 2 is in another self-locking state in the condition shown in FIG. 3A, which is also a very stable state. Therefore, the opening and closing mechanism is kept at the closing position.

The working process and principle may also refer to the parent application U.S. Ser. No. 15/832,655.

Embodiment 2

Figure 6:
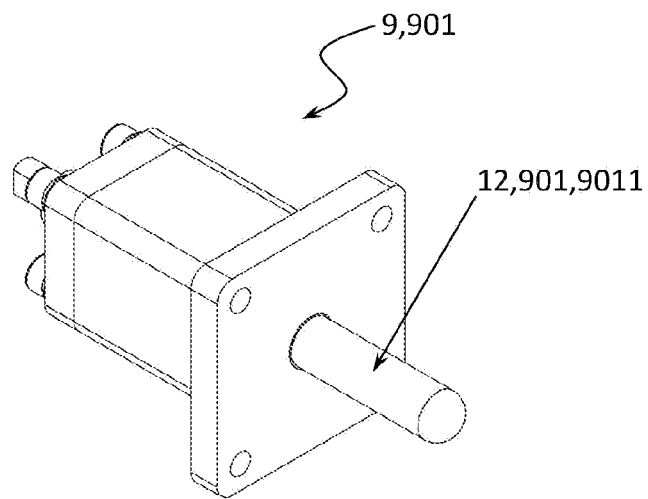
FIG. 6 is a schematic view of a second elastic member.

As shown in FIG. 6, the limit stop 9 has an elastic member 12 so that the projection 901 and the receive part 902 can have elastic deformation after coming into contact (instead of rigid contact), thus to realize self-locking.

Optionally, the elastic member 12 is arranged on the projection 901 and/or on the receive part 902.

Optionally, the elastic member 12 is a contact part 9011 with elasticity, which is preferably arranged on the projection 901, as shown in FIG. 6. The contact part 9011 is compressed, when the receive part 902 comes into contact with the raised contact part 9011. The contact part 9011 recovers, when the receive part 902 leaves the raised contact part 9011.

The contact part 9011 with elasticity may be implemented according to the principle of springs, or may be made from material having elasticity, for example, rubber etc.

In this embodiment, different from Embodiment 1, since the limit stop 9 is elastic, the locking device, the support arm and the sliding groove may be all made into a rigid structure, leading to simpler structure and more convenient production. Compared with Embodiment 1, when it is needed to replace the elastic member 12, the replacement will be more convenient in the case where the elastic member 12 is arranged on the limit stop 9 than in the case where it is arranged on the locking device 2. Thus, the maintenance efficiency is improved.

Figure 7D:
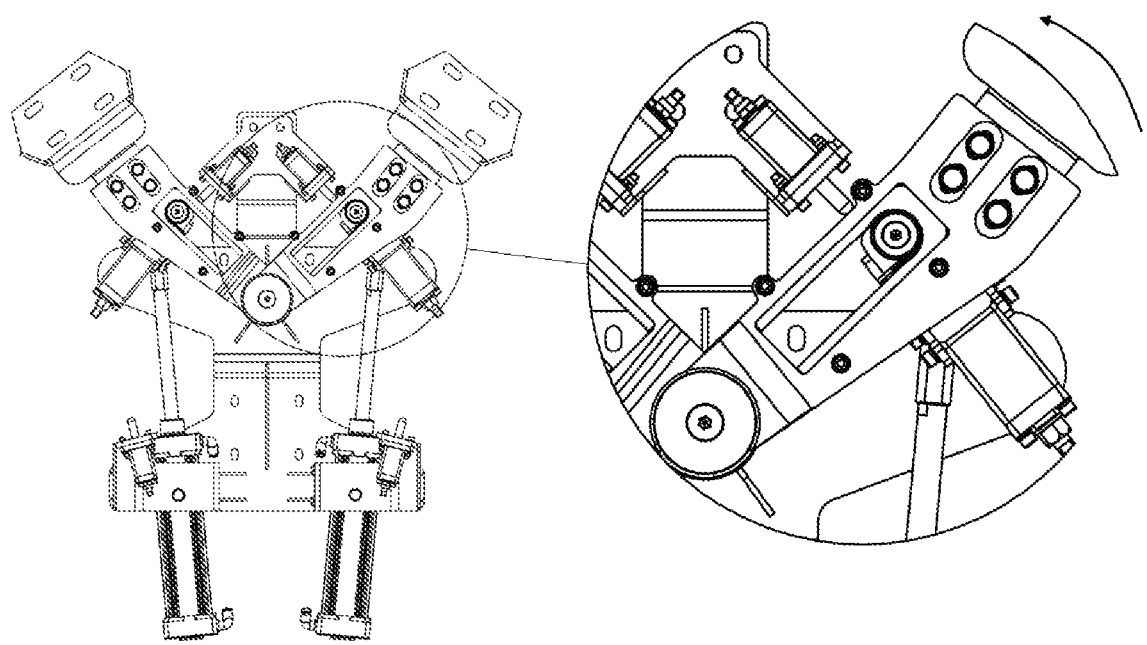

As shown in FIG. 7A to FIG. 7D (some components are omitted), during the closing of the opening and closing mechanism, when the first projection 1001 comes into contact with the first receive part 1002, the elastic member 12 (the contact part 9011) begins to be compressed, as shown in FIG. 7B. When the locking device 2 is rotated until its central axis is substantially perpendicular to the central axis of the support arm, a critical point of close mechanical "dead point" is reached; at this moment, the rotating shaft 203 of the locking device is closest to the support arm 3, and the elastic member 12 is compressed to the maximum, as shown in FIG. 7C. When continuously rotating the locking device 2, the second end 202 of the locking device continuously rolls in the sliding groove 5 and thus moves beyond the mechanical "dead point". In this case, the rotating shaft 203 is not the closest from the support arm 3, thus the elastic member 12 is completely or partially released. In this case, the close state is limited, as shown in FIG. 7D. In this way, the closed-state self-locking state as described in Embodiment 1 is realized. If unlocking is desired, an additional force is applied to pull the second end 202 of the locking device to move in the reverse direction (move downward to the left) in the sliding groove 5 and greater squeezing effect is produced between the contact part 9011 and the receive part 902 (that is, the elastic member 12 is more squeezed).

The working principle in the opening process is similar to that of the closing process and will not be repeated here. The working principle in the opening process may also be understood in combination with Embodiment 1.

Embodiment 3

Figure 8:
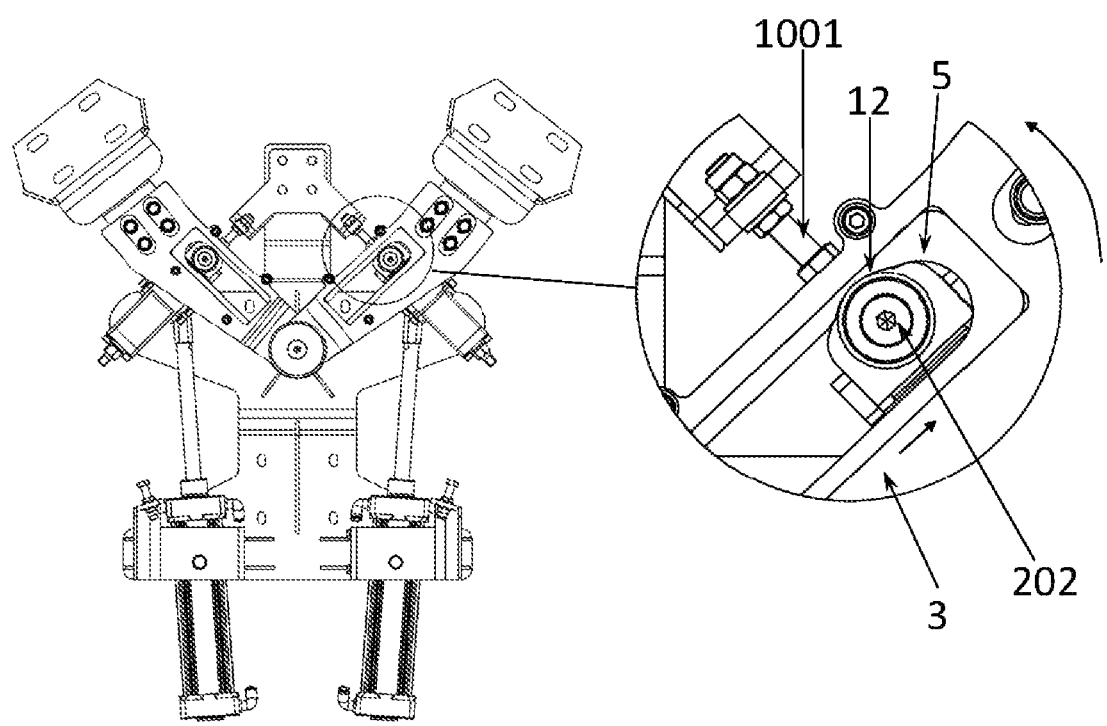
FIG. 8 is a schematic view of an implementation of a third elastic member.

As shown in FIG. 8, an elastic member 12, which is deformable, is arranged in the sliding groove 5. The elastic member 12 is compressed, when the locking device 2 is substantially perpendicular to the sliding groove 5.

Optionally, the elastic member 12 is made from deformable and wear-resistant material and mounted in the sliding groove 5. As shown in FIG. 8, the elastic member 12 is compressed to the maximum and thus deformed, when the locking device 2 is substantially perpendicular to the sliding groove 5. In FIG. 8, the elastic member 12 is squeezed, to be a concave, by the second end 202 of the locking device. When the second end 202 of the locking device continuously moves upward to the right, the elastic member 12 completely or partially recovers. In this way, self-locking is realized.

Figure 9:
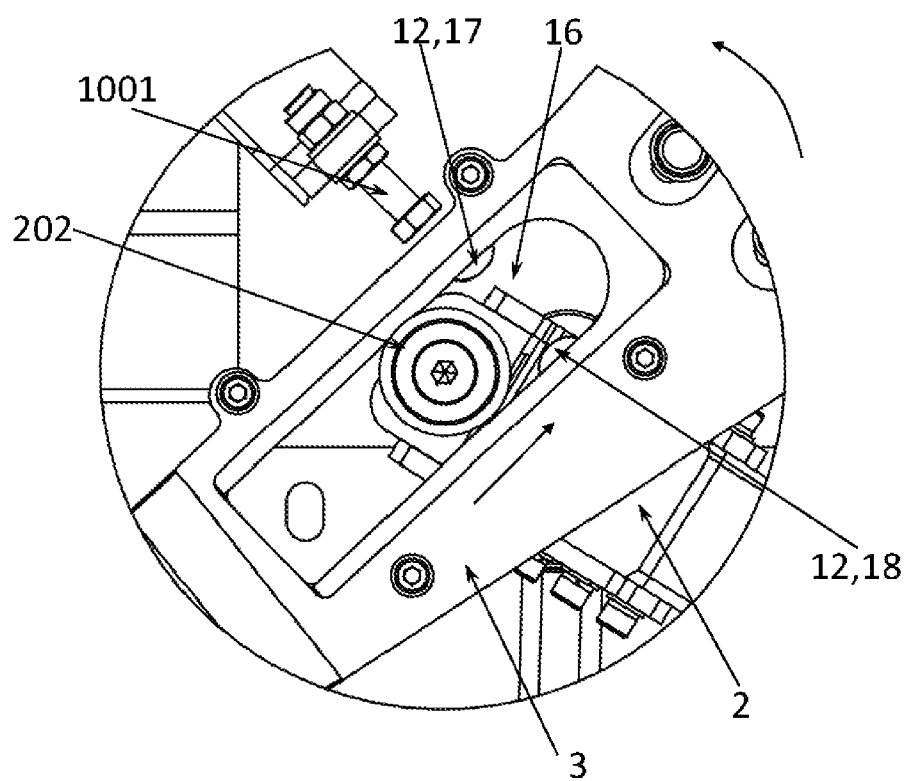
FIG. 9 is a schematic view of another implementation of the third elastic member.

Or, optionally, as shown in FIG. 9, a first gap 16 is formed by the elastic member 12 in the sliding groove. The first gap has a width less than the diameter of the second end 202 of the locking device. Thus, when the second end 202 of the locking device moves in the sliding groove and to the first gap 16, the elastic member 12 is deformed and squeezes the second end 202 of the locking device.

Optionally, the elastic member 12 may be a third projection 17 with elasticity as shown in FIG. 9, and the first gap 16 is formed between the third projection 17 and the sliding groove 5. Or, the elastic member 12 may be a third projection 17 and a fourth projection 18, which are elastic and which are arranged opposite to each other, as shown in FIG. 9, and the first gap 16 is formed between the third projection 17 and the fourth projection 18.

The third projection and the fourth projection can be made from conventional deformable and wear-resistant material, for example, rubber etc. In the closing process (the direction indicated by the rotation arrows in FIG. 8 and FIG. 9), when the first projection 1001 comes into contact with the first receive part 1002, the second end 202 of the locking device continuously moves toward the elastic member 12 (the direction indicated by the straight arrows in FIG. 8 and FIG. 9) and gradually squeezes the elastic member 12. When the locking device 2 is rotated until its central axis is substantially perpendicular to the central axis of the support arm, a critical point of close mechanical "dead point" is reached (at the first gap 16); at this moment, the rotating shaft 203 of the locking device is closest to the support arm 3, and the elastic member 12 is compressed to the maximum. When continuously rotating the locking device 2, the second end 202 of the locking device continuously rolls in the sliding groove 5 and thus moves beyond the mechanical "dead point". In this case, the rotating shaft 203 is not the closest from the support arm 3, thus the elastic member 12 is completely or partially released. In this case, the close state is limited. In this way, the self-locking state as described in Embodiment 1 is realized. If unlocking is desired, an extra force is needed to be applied to pull the second end 202 of the locking device to move in the reverse direction in the sliding groove 5 by the elastic member 12.

The working principle in the opening process is similar to that of the closing process and will not be repeated here. The working principle in the opening process may also be understood in combination with Embodiment 1.

Embodiment 4

Figure 10:
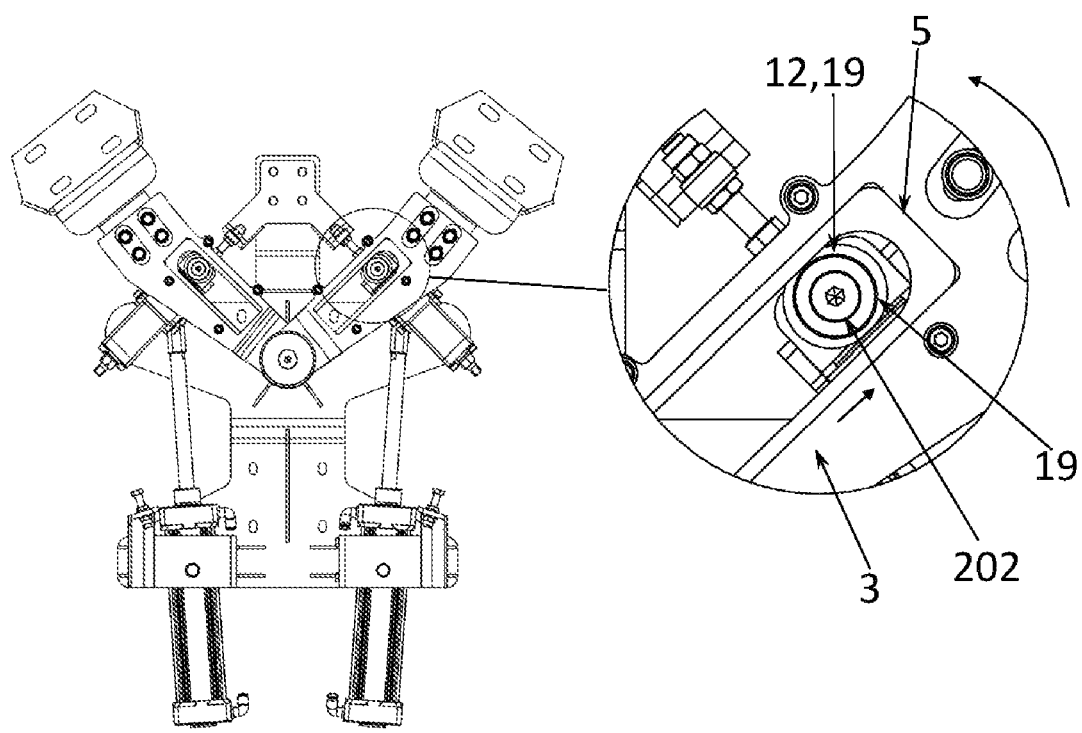
FIG. 10 is a schematic view of an implementation of a fourth elastic member.
Figure 11:
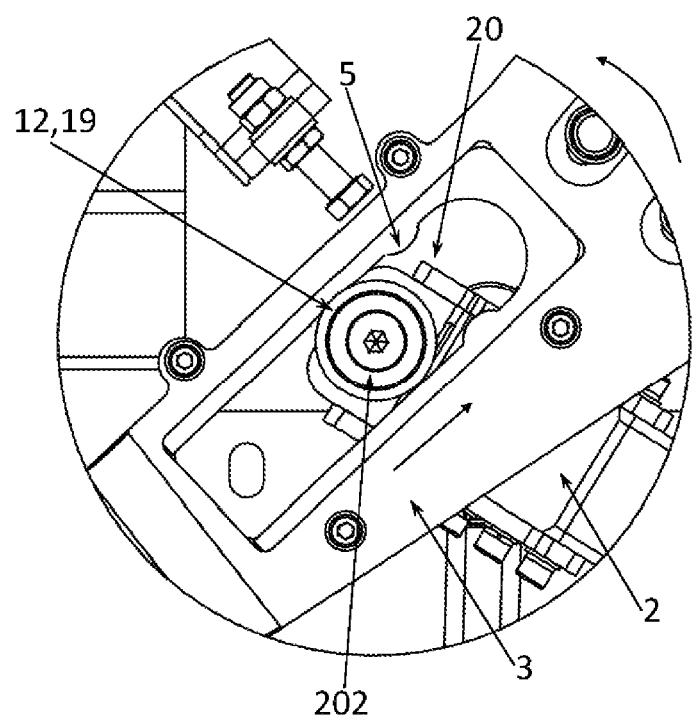
FIG. 11 is a schematic view of another implementation of the fourth elastic member.

As shown in FIG. 10 and FIG. 11, an elastic member 12 is provided at the second end 202 of the locking device. The elastic member 12 is compressed when the locking device 2 is substantially perpendicular to the sliding groove 5.

Optionally, the elastic member 12 is made from deformable and wear-resistant material, and at least is mounted at a contact position where the second end 202 of the locking device comes into contact with the sliding groove 5. Optionally, the elastic member 12 is an elastic rolling wheel 19 sleeved on the second end 202 of the locking device, which can be made from conventional deformable and wear-resistant material, for example, rubber etc. and which can be rotated with respect to the second end 202.

The elastic member 12 is compressed to the maximum by the sliding groove 5 and thus deformed, when the locking device 2 is substantially perpendicular to the sliding groove 5. As shown in FIG. 10, the part of the rolling wheel 19 close to the sliding groove 5 (at the upper left of the rolling wheel) is almost squeezed to be a straight line by the sliding groove. The rolling wheel 19 completely or partially recovers, when the second end 202 of the locking device continuously moves upward to the right.

Optionally, as shown in FIG. 11, a second gap 20 is formed in the sliding groove 5. The second gap has a width less than the diameter of the second end 202 of the locking device. Thus, when the second end 202 of the locking device moves in the sliding groove, the elastic member 12 is deformed at the second gap 20 and squeezed by the second gap 20.

The implementation of this embodiment is similar to Embodiment 3. That is, the elastic member 12 at the second end of the locking device is compressed to the maximum at the second gap to form the "dead point". The working process will not be repeated here. It may also be understood in combination with Embodiment 1 or the parent application U.S. Ser. No. 15/832,655.

The above Embodiment 3 and Embodiment 4 may be summarized as follows: the elastic member 12 is mounted at a contact position where the second end of the locking device comes into contact with the sliding groove, especially at a contact position where the second end of the locking device comes into contact with the sliding groove when the locking device 2 is substantially perpendicular to the sliding groove 5. On this basis, it may be considered that the technical solutions in Embodiment 3 and the solutions in Embodiment 4 can be used in combination. For example, a first elastic member 12 is provided at the second end 202 of the locking device, and a second elastic member 12 is also provided in the sliding groove 5. However, it is more convenient for replacement in the case where the elastic member 12 is arranged at the second end 202 of the locking device than in the case where it is arranged in the sliding groove 5. It is more convenient for replacement by using Embodiment 4, since the elastic member is easily worn or aged particularly when it is made from elastic material.

A second implementation of the present application provides a train. Two opening and closing mechanisms, which are arranged symmetrically, are provided at an end of the train. Each of the opening and closing mechanisms is the opening and closing mechanism described above. The train may be high-speed trains, subways and other conventional railway vehicles.

The invention claimed is:

1. An opening and closing mechanism, comprising a driving device, a locking device and a support arm; wherein,
   the driving device is connected to the locking device to drive the locking device to rotate;
   a first end of the locking device is rotatably mounted on a baseplate;
   a sliding groove in which a second end of the locking device is slidably located is formed on the support arm;
   a first end of the support arm is rotatably mounted on the baseplate; a second end of the support arm is connected to a fairing;
   the driving device drives the locking device to rotate, the locking device drives the support arm to rotate by the sliding groove, so that the support arm opens or closes the fairing; and
   the locking device is able to realize self-locking of the opening and closing mechanism;
   the opening and closing mechanism further comprising a closed-state limit stop and an open-state limit stop, used to limit the closing and opening of the fairing in a limit stop state, respectively; wherein, the sliding groove has two opposite end sides and is arranged so that when the locking device is perpendicular to the sliding groove, the closed-state limit stop or the open-state limit stop is in the limit stop state, and there is an allowance (L) between one of the two opposite end sides that is closer to the second end of the support arm and the second end of the locking device and thus the locking device is able to move in a direction of the allowance in the sliding groove to realize self-locking.

2. The opening and closing mechanism according to claim 1, wherein, the opening and closing mechanism further has an elastic member, working together with the locking device, the support arm and the closed-state limit stop or the open-state limit stop to realize the self-locking of the opening and closing mechanism.

3. The opening and closing mechanism according to claim 2, wherein, the elastic member adopts at least one of the following schemes:
   first scheme: the elastic member is arranged in the locking device, and comprises a rod on which a spring is pre-compressed; a first end of the rod is a free end, and a second end of the rod is provided with a raised member serving as the second end of the locking device and being slidably located in the sliding groove;
   second scheme: the elastic member is arranged on the closed-state limit stop and the open-state limit stop, so that each of the closed-state limit stop and the open-state limit stop is able to have elastic deformation;

third scheme: each of the closed-state limit stop and the open-state limit stop has a projection and a receive part, restraining against each other to limit the closing or opening of the fairing; the elastic member is a contact part with elasticity, is arranged on the projection of each of the closed-state limit stop and the open-state limit stop, and is able to be compressed when coming into contact with the receive part;

fourth scheme: the elastic member is arranged between the second end of the locking device and the sliding groove;

fifth scheme: the elastic member is arranged at least at a contact position where the second end of the locking device comes into contact with the sliding groove; and the contact position is a position where the second end of the locking device comes into contact with the sliding groove when the locking device is substantially perpendicular to the sliding groove during the opening or closing of the fairing.

4. The opening and closing mechanism according to claim 3, wherein, in the fourth scheme or the fifth scheme, the elastic member is arranged in the sliding groove; and the elastic member is compressed, when the locking device is substantially perpendicular to the sliding groove, during the opening or closing of the fairing.

5. The opening and closing mechanism according to claim 4, wherein, the elastic member is made from deformable material.

6. The opening and closing mechanism according to claim 4, wherein, a gap is formed by the elastic member in the sliding groove; and the gap has a width less than a diameter of the second end of the locking device.

7. The opening and closing mechanism according to claim 3, wherein, in the fourth scheme or the fifth scheme, the elastic member is arranged at the second end of the locking device; and the elastic member is compressed, when the locking device is substantially perpendicular to the sliding groove, during the opening or closing of the fairing.

8. The opening and closing mechanism according to claim 7, wherein, the elastic member is an elastic rolling wheel sleeved on the second end of the locking device.

9. The opening and closing mechanism according to claim 8, wherein, a gap is formed in the sliding groove; and the gap has a width less than a diameter of the second end of the locking device.

10. The opening and closing mechanism according to claim 1, wherein, the driving device is a powered push cylinder having a piston rod connected to the locking device to drive the locking device to rotate.

11. A train having an opening and closing mechanism, the opening and closing mechanism comprising a driving device, a locking device and a support arm; wherein,
the driving device is connected to the locking device to drive the locking device to rotate;
a first end of the locking device is rotatably mounted on a baseplate;
a sliding groove in which a second end of the locking device is slidably located is formed on the support arm;
a first end of the support arm is rotatably mounted on the baseplate; a second end of the support arm is connected to a fairing;

the driving device drives the locking device to rotate, the locking device drives the support arm to rotate by the sliding groove, so that the support arm opens or closes the fairing;
the opening and closing mechanism further comprising a closed-state limit stop and an open-state limit stop, used to limit the closing and opening of the fairing in a limit stop state, respectively; wherein, the sliding groove has two opposite end sides and is arranged so that when the locking device is perpendicular to the sliding groove, the closed-state limit stop or the open-state limit stop is in the limit stop state, and there is an allowance (L) between one of the two opposite end sides that is closer to the second end of the support arm and the second end of the locking device and thus the locking device is able to move in a direction of the allowance in the sliding groove to realize self-locking.

12. The train according to claim 11, wherein, there is a pair of the opening and closing mechanisms, arranged symmetrically.

13. The opening and closing mechanism according to claim 3, wherein, when the locking device is substantially perpendicular to the sliding groove, the elastic member is compressed to a maximum amount.

14. The opening and closing mechanism according to claim 1, wherein, the closed-state limit stop comprises a first projection and a first receive part; the first projection is able to contact with the first receive part, restricting continuous motion of each other, so that the closed-state limit stop is in the limit stop state; and the open-state limit stop comprises a second projection and a second receive part; the second projection is able to contact with the second receive part, restricting continuous motion of each other, so that the open-state limit stop is in the limit stop state.

15. An opening and closing mechanism, comprising a driving device, a locking device and a support arm; wherein,
the driving device is connected to the locking device to drive the locking device to rotate;
a first end of the locking device is rotatably mounted on a baseplate;
a sliding groove in which a second end of the locking device is slidably located is formed on the support arm;
a first end of the support arm is rotatably mounted on the baseplate; a second end of the support arm is connected to a fairing;
the driving device drives the locking device to rotate, the locking device drives the support arm to rotate by the sliding groove, so that the support arm opens or closes the fairing; and
means for realizing self-locking of the opening and closing mechanism via an elastic force after the locking device is rotated to reach a mechanical dead point;
the opening and closing mechanism further comprising a closed-state limit stop and an open-state limit stop, used to limit the closing and opening of the fairing in a limit stop state, respectively; wherein, the sliding groove has two opposite end sides and is arranged so that when the locking device is perpendicular to the sliding groove, the closed-state limit stop or the open-state limit stop is in the limit stop state, and there is an allowance (L) between one of the two opposite end sides that is closer to the second end of the support arm and the second end of the locking device and thus the locking device is able to move in a direction of the allowance in the sliding groove to realize self-locking.

* * * * *